Nov. 1, 1927.
E. BRYANT
HAYSTACKER
Filed Dec. 12, 1925
1,647,955
3 Sheets-Sheet 3
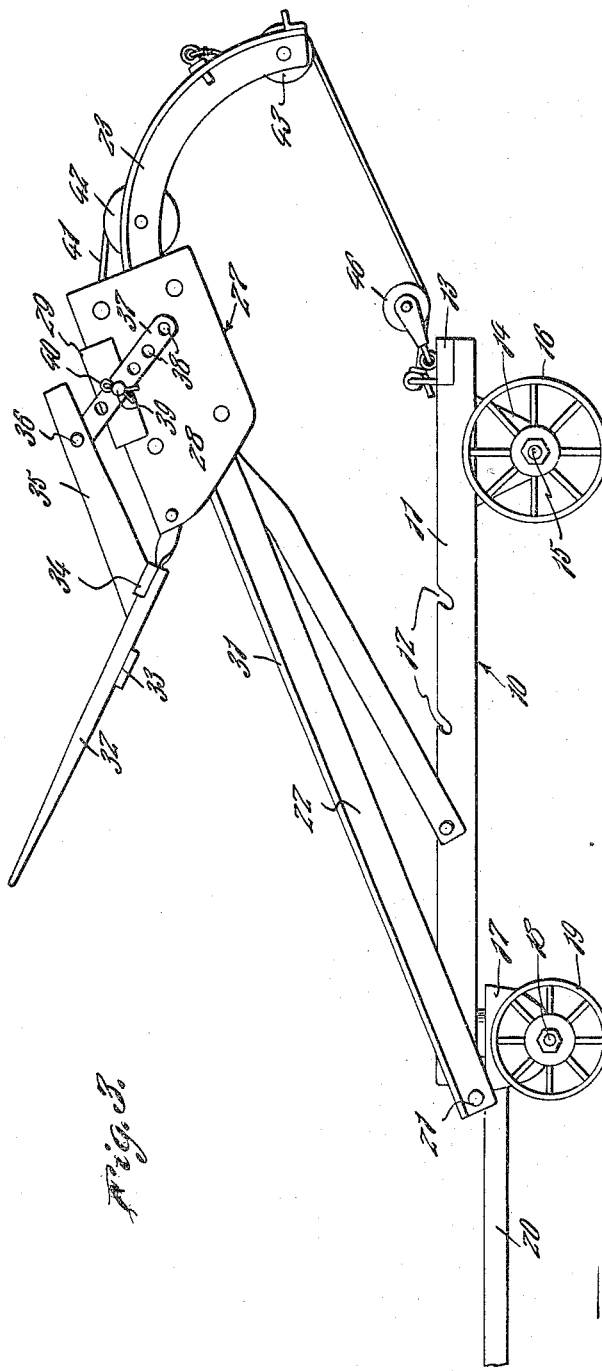
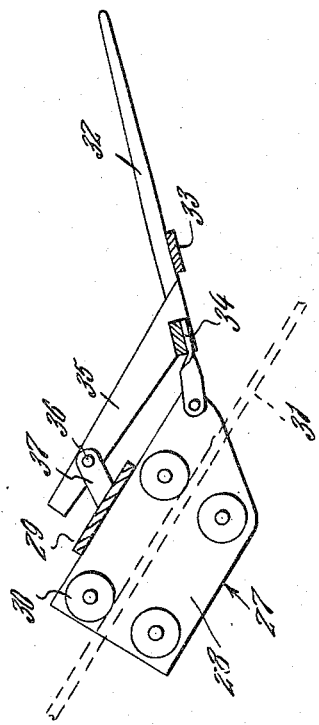
Eugene Bryant, INVENTOR
BY Victor J. Evans, ATTORNEY Patented Nov. 1, 1927.

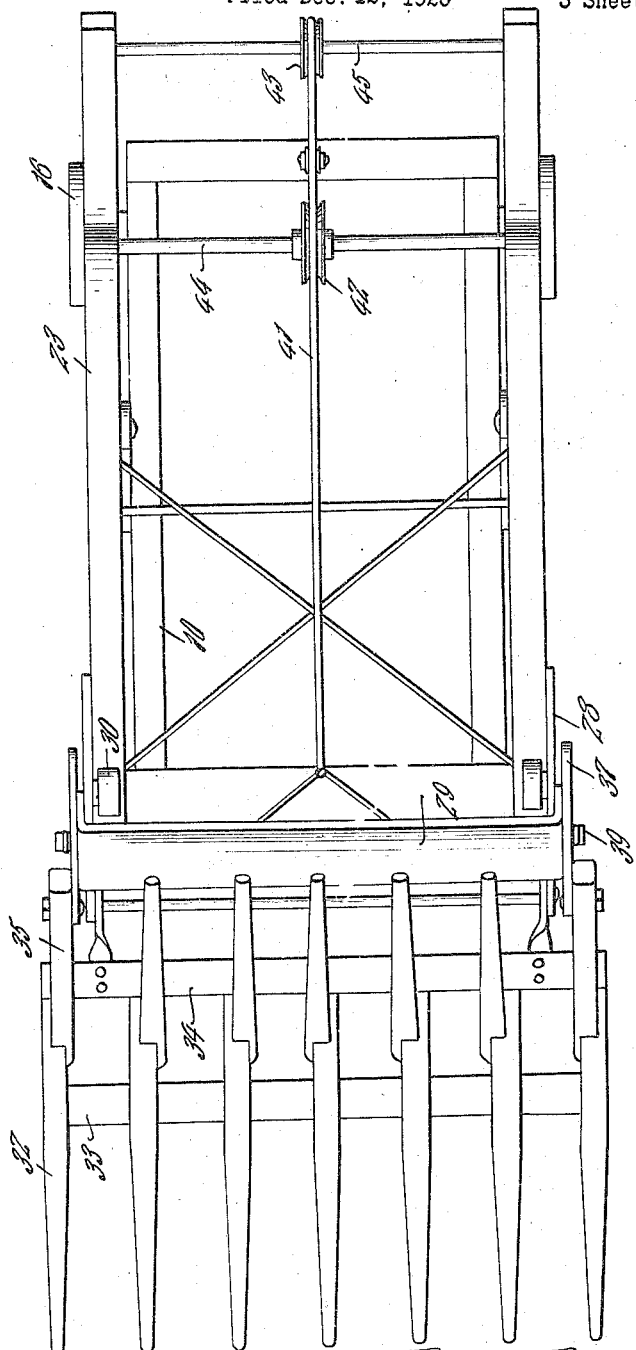

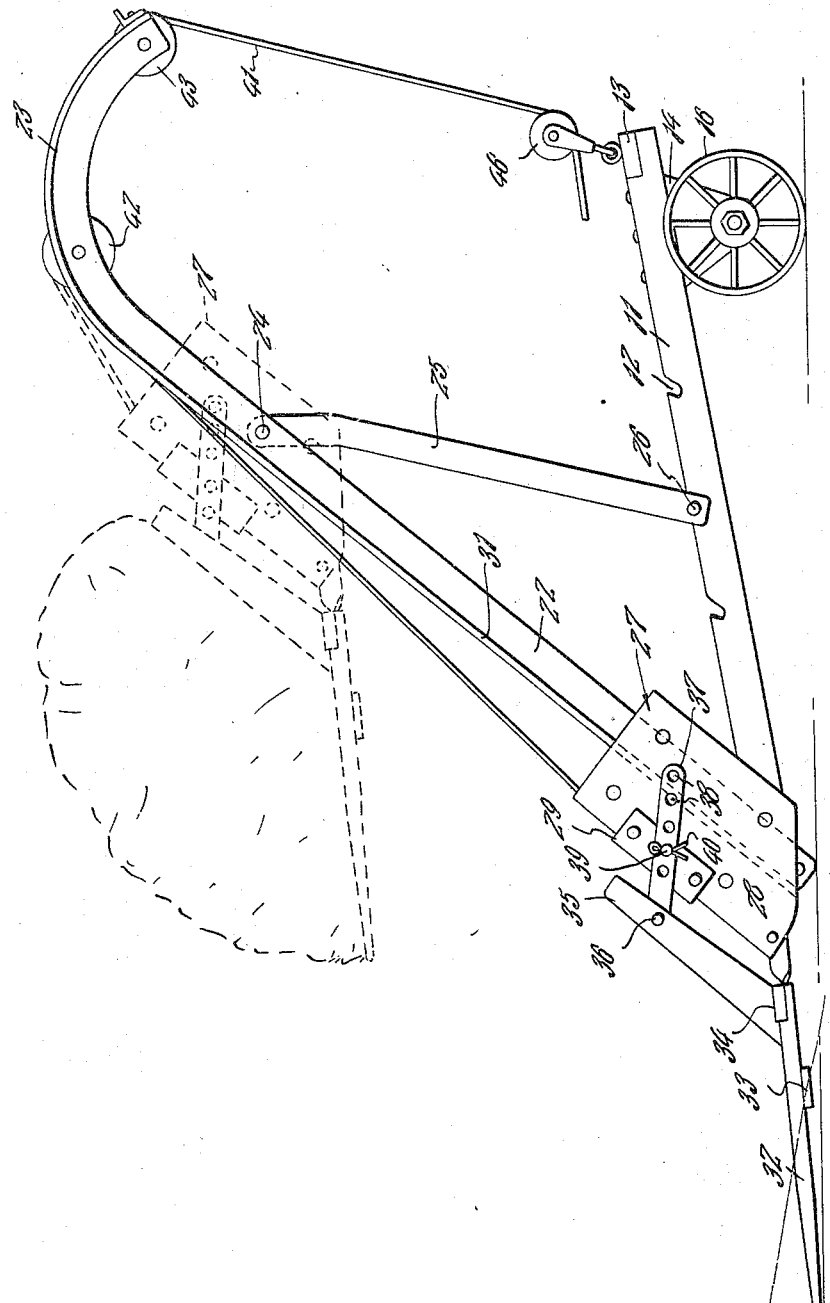

1,647,955

UNITED STATES PATENT OFFICE.

EUGENE BRYANT, OF BARDSTOWN, KENTUCKY.

HAYSTACKER.

Application filed December 12, 1925. Serial No. 75,079.

This invention relates to agricultural machinery, particularly to hay loaders, and has for its object the provision of a novel device by means of which shocks or bundles of hay or the like may be elevated and deposited in stack formation, the device embodying means whereby adjustment may be made to take care of the continual increase in the height of the stack.

Another object of the invention is to provide a machine of this character which may be readily transported from place to place wherever its use may be needed, a wheel supported truck structure being detachably connected with the forward end of the supporting frame of the mechanism for this purpose.

Still another object of this invention is to provide a loader of his character embodying a scoop member onto which the shocks or bundles of hay may be placed, means connected with the scoop whereby a horse may be utilized for providing the necessary lifting power to elevate the hay onto a stack in process of formation.

Still another object is to provide a device of this character embodying certain adjustment features in the scoop structure whereby to increase the efficiency under various circumstances, or conditions.

Still another object is the provision of an apparatus of this character embodying novel means for changing the elevation of the track members upon which the scoop travels, this feature being of prime importance when considering the gradual and constant change in the height of the stack onto which the hay is being deposited.

An additional object is the provision of a mechanism of this character which will be simple and inexpensive in manufacture, easy to use and adjust, positive in action, efficient and durable in service, and a general improvement in the art.

With the above and other objects and advantages in view, the invention consists in the details of construction and the arrangement and combination of parts to be hereinafter more fully described, and claimed, and illustrated in the accompanying drawings, in which:—

Figure 1 is a top plan view of the complete device.

Figure 2 is a side elevation thereof showing the initial position of the scoop and representing it as resting upon the ground, an elevated position of the scoop being shown by dotted lines.

Figure 3 is a side elevation showing the forward truck engaging beneath the frame and showing the scoop in elevated position, and Figure 4 is a detail sectional view through the scoop.

Referring more particularly to the drawings, I have shown the device as comprising a preferably rectangular frame designated generally by the numeral 10, which frame may consist of a pair of elongated longitudinally extending side bars 11 notched as indicated at 12 for a purpose to be described, and connected at their forward and rear ends by cross bars 13 and any preferred or necessary number of braces or auxiliary elements. Mounted at the rear end of the frame 10 is a bolster 14 carrying an axle 15 on which are mounted ground engaging wheels 16 intended to remain permanently in place. Detachably engageable with the forward end of the frame, by any desired specific means, is a bolster 17 carrying an axle 18 upon which are mounted ground engaging wheels 19. Associated with or connected with this front bolster is a draft tongue 20 by means of which the device may be transported from place to place by means of draft animals, a tractor, truck or the like.

Pivotally mounted upon the forward end of the frame 10, as shown at 21, are curved track members 22 which may be of any desired cross sectional configuration and which have their rear ends 23 curved downwardly as shown for a reason to be explained. Pivotally connected with these track members 22, as shown at 24, are brace bars 25 carrying a transverse rod, pins or other elements 26 adapted to be engaged within selected ones of the notches 12 for the purpose of varying the angular inclination of the track members 22 as will be readily apparent from a comparison of Figures 2 and 3.

Slidably mounted upon the track members 22 is the loader or scoop device designated generally by the numeral 27. This scoop device comprises side members 28 of plate-like form connected by a substantially U-shaped member 29 as indicated in Figures 1 and 3. Mounted on the confronting or inner faces of the plate-like side members 28 are rollers 30 which bear against the horizontal flange 31 of the track members 22, so as to guide the scoop 27 during its travel along the track members. The scoop member further includes a plurality of spaced parallel fingers 32 connected by cross bars 33 and 34 and formed or provided with differently inclined rearward extension members 35 which cooperate with the fingers to define means for supporting shocks or bundles of hay or the like. Pivotally connected at 36 with the two outermost rearward extensions 35 are downwardly and rearwardly inclined arms 37 each of which is formed with a plurality of holes 38, selected ones of which may be engaged upon studs 39 or the like projecting laterally from the end portions of the connecting member 29, these studs having cotter pins 40 or the like passing therethrough whereby to prevent the arms 37 from becoming disconnected therefrom accidentally. Obviously, by engaging different ones of the holes 38 upon the studs 39 the angular positions of the fingers 32 and rearward extensions 35 may be varied to meet different positions such, for instance, as differences in the height of the stacks being formed.

Connected with some suitable point on the scoop 27 is a flexible member 41 such as a rope, cable or the like, trained over guide pulleys 42 and 43 carried by shaft members 44 and 45 respectively which extend across the rear portions of the track members 22, the rear portion being indicated at 23 as above mentioned. After passing over the guide pulley 43, the flexible member is trained about a guide pulley 46 mounted at the rear end of the frame 10, and this flexible member is adapted to be connected with any suitable draft device to which a horse may be attached so that when the horse is driven the proper direction, the flexible member will be pulled for moving the scoop 27 upwardly along the track members 22.

In the operation of the device, it will be seen that after being transported to the place where its operation is needed, the front bolster carrying the tongue and the wheels 19 is removed so that the forward end of the frame 10 may rest upon the ground, as indicated in Figure 2. The scoop 27 is then permitted to descend the trackways 22 until the fingers 32 may rest upon the ground so that a shock of hay, or bundles thereof may be placed easily upon these fingers. In the case of a shock, it is quite evident that the shock may be drawn to the device by means of a chain thrown about it and pulled by a horse, as is a common practice. In case bundles of hay or other material are placed upon the fingers it is evident that they may be thrown thereon by pitch forks or the like, such details being absolutely immaterial. However, assuming that the device has been placed in the position shown in Figure 2, it will be apparent that after a bundle of hay, or shocks thereof has been placed upon the fingers 32, the horse connected or attached to the flexible member 41 is driven in a direction toward the front end of the machine and away from it so as to pull the flexible member. When this is done, it is quite evident that the scoop 27 will be drawn upwardly along the inclined track member 22 and when the scoop reaches the downwardly curved rear end 23 of the track members it is obvious that it will become more or less inverted so that the shocks or bundles of hay or other material carried by this scoop will be dumped off onto the ground or onto a partially completed stack. As the work of building the stack progresses, it is intended that the brace members 25 be detached from the forwardmost notches 12 and be moved rearwardly into the other notches so as to increase the elevation of the track members as clearly indicated in Figure 2 of the drawings. After the work of forming a single stack has been completed, it is evident that the front bolster, wheel and tongue carried thereby should be replaced in operative connection at the forward end of the frame so that the device may be transported to another place where its use is necessary. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claim.

Having thus described the invention, I claim:—

In a device of the character described, a wheel supported frame, spaced longitudinally extending curved track members pivotally mounted upon the frame and provided with means for effecting adjustment of the angular inclination thereof, a plurality of guide pulleys journally mounted between the bars or tracks, a guide pulley mounted upon the rear end of the wheeled frame, and a carriage movably mounted upon the track and including sides equipped with rollers journaled thereon and engaging respectively upon the top and bottom of the track, said track being of angle bar formation to provide flanges upon which the rollers travel, a scoop structure pivotally mounted upon the sides of the carriage and including a plurality of spaced normally forwardly extending fingers, arms mounted at the sides of the scoop, links pivotally connected with said arms and each provided with a series of holes, and outwardly extending studs on the sides of the carriage engageable through selected ones of said holes for holding the scoop in a selected adjusted position with respect to the carriage upon which it is mounted, and a flexible member trained about all of said guide pulleys and connected with the carriage for effecting movement thereof along the tracks.

In testimony whereof I affix my signature.

EUGENE BRYANT.